(No Model.)

J. ELWOOD.
FURNITURE CASTER.

No. 490,016. Patented Jan. 17, 1893.

Witnesses
B. S. Ober
H. J. Riley

Inventor
Jonathan Elwood,
By his Attorneys,
C. A. Snow & Co.

UNITED STATES PATENT OFFICE.

JONATHAN ELWOOD, OF SANGER, CALIFORNIA.

FURNITURE-CASTER.

SPECIFICATION forming part of Letters Patent No. 490,016, dated January 17, 1893.

Application filed October 8, 1892. Serial No. 448,222. (No model.)

*To all whom it may concern:*

Be it known that I, JONATHAN ELWOOD, a citizen of the United States, residing at Sanger, in the county of Fresno and State of California, have invented a new and useful Insect Trap or Guard, of which the following is a specification.

The invention relates to improvements in insect traps or guards.

The object of the present invention is to provide a simple and inexpensive insect trap or guard adapted to be readily employed on the legs of bedsteads, tables and other furniture similar to the ordinary caster to prevent insects ascending the legs and capable of preventing children or small animals, such as a dog or cat, interfering with its contents.

A further object of the invention is to enable the receptacle to be readily filled or inspected from time to time without the caster portion falling from the leg and upsetting and spilling the contents of the receptacle.

The invention consists in the construction and novel combination and arrangement of parts hereinafter fully described, illustrated in the accompanying drawings and pointed out in the claim hereto appended.

Figure 1:
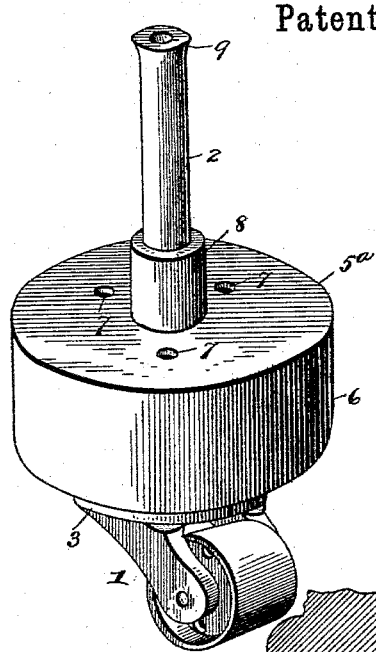
Figure 2:
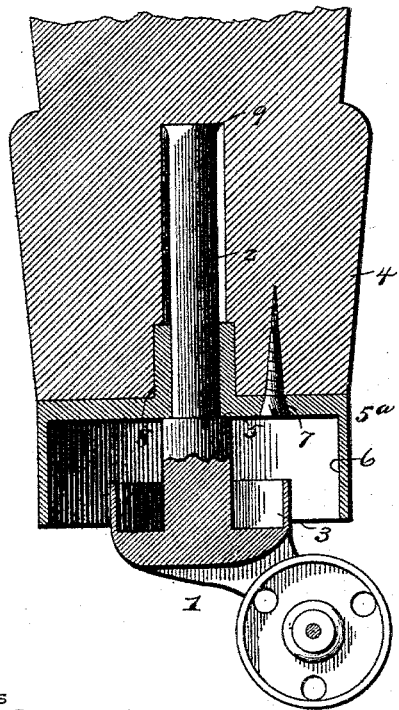
Figure 3:
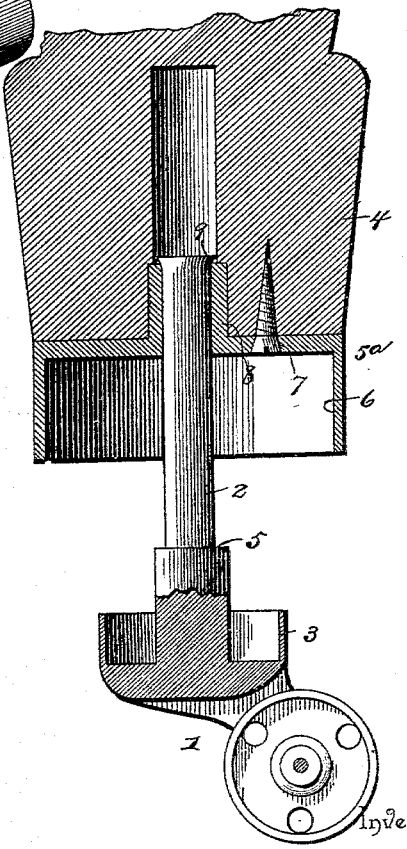

In the drawings—Figure 1 is a perspective view of an insect guard or trap constructed in accordance with this invention. Fig. 2 is a vertical sectional view of the same showing the trap or guard applied to a leg. Fig. 3 is a similar view showing the receptacle drawn down from beneath the cover.

Like numerals of reference indicate corresponding parts in all the figures of the drawings.

1 designates a caster provided at the base of its stem 2 with an integral cup 3 which is cylindrical and which is adapted to contain a suitable poison for killing insects attempting to crawl up the leg 4. The stem 2 is provided a short distance above the cup or receptacle 3 with an annular supporting shoulder 5 upon which rests a cylindrical cover 5ª having its depending flange 6 arranged concentric with the sides of the cup or receptacle 3 and extending considerably below the top thereof to prevent children putting their fingers up the space between the cover and the cup or receptacle and reaching the contents of the latter or putting extraneous matter therein. The cover which is designed to be of a diameter equal to that of the leg or thereabout, has screw openings 7 in its top for receiving the screws for securing the cover to the leg 4, and it is provided with a central upwardly extending bushing 8 which is formed integral with it and which enters the bore of the leg and forms a bearing for the spindle or stem 2 of the caster. The stem of the caster between the annular supporting shoulder 5 and the upper end fits the cylindrical opening of the bushing and when it is desired to inspect the contents of the cup or receptacle the leg is lifted to cause the cup or receptacle to drop below the cover as illustrated in Fig. 3 of the accompanying drawings.

In order to prevent the caster portion dropping out of the bore of the leg and upsetting the receptacle and spilling the contents thereof, the upper end of the stem 2 is provided with a head 9 which is of greater diameter than the bore of the bushing, and which forms a stop to limit the downward movement of the caster portion of the device. By this construction, the cup or receptacle may be readily refilled or inspected from time to time by simply lifting the leg and that there is no liability of the caster portion of the device dropping from the leg and spilling the contents of the cup or receptacle.

It will be seen that the guard or trap is simple and comparatively inexpensive in construction, that it is adapted to be readily applied to the leg of a piece of furniture, that it is capable of preventing ants ascending the leg, and of having its contents tampered with by children, and that it may be readily inspected when desired.

What I claim is—

An insect guard or trap comprising a caster provided at the base of its stem with an integral receptacle or cup and having on its stem a short distance above the receptacle an annular supporting shoulder and provided at the top of its stem with a head forming a stop, and a cover arranged on the stem and having its flange or sides depending below the top of the cup or receptacle, said cover being provided in its top with screw openings and having a centrally arranged upwardly extending bushing receiving the stem and designed to be inserted in the bore of a leg, substantially as described.

In testimony that I claim the foregoing as my own I have hereto affixed my signature in the presence of two witnesses.

JONATHAN ELWOOD.

Witnesses:
K. M. BROWN,
C. C. BAER.